United States Patent [19]
Doi et al.

[11] Patent Number: 5,536,798
[45] Date of Patent: * Jul. 16, 1996

[54] OPTICAL MATERIAL

[75] Inventors: Toru Doi; Tomohiro Ishikawa, both of Yokkaichi, Japan

[73] Assignee: Tosoh Corporation, Japan

[*] Notice: The term of this patent shall not extend beyond the expiration date of Pat. No. 5,208,307.

[21] Appl. No.: 357,343

[22] Filed: Dec. 15, 1994

Related U.S. Application Data

[63] Continuation of Ser. No. 253,221, Jun. 2, 1994, abandoned, which is a continuation of Ser. No. 718,411, Jun. 24, 1991, abandoned.

[30] Foreign Application Priority Data

Jun. 28, 1990 [JP] Japan .................................. 2-168440
Aug. 24, 1990 [JP] Japan .................................. 2-221211

[51] Int. Cl.$^6$ .................. C08F 222/40; C08F 226/06; C08F 210/00; G02B 3/00
[52] U.S. Cl. .................. 526/262; 526/348.8; 359/642
[58] Field of Search .................. 526/262, 348.8; 359/642

[56] References Cited

U.S. PATENT DOCUMENTS

| | | | |
|---|---|---|---|
| 2,301,356 | 11/1942 | Arnold et al. | 526/262 |
| 3,352,832 | 11/1967 | Barr et al. | 526/262 |
| 5,146,535 | 9/1992 | Anzai et al. | 525/329.1 |
| 5,208,307 | 5/1994 | Doi et al. | 526/262 |

FOREIGN PATENT DOCUMENTS

| | | | |
|---|---|---|---|
| 1215810A | 8/1989 | Japan | 526/262 |

OTHER PUBLICATIONS

Patent Abstracts of Japan, vol. 11, No. 139; "Optical Disc Base"; Tanaka; Dec. 1986.

Patent Abstracts of Japan, vol. 13, No. 529; "Methacrylic Resin for Optical Device"; Kawachi; Aug. 1989.

*Primary Examiner*—Joseph L. Schofer
*Assistant Examiner*—Wu C. Cheng
*Attorney, Agent, or Firm*—Nixon & Vanderhye

[57] ABSTRACT

An optical material, comprising a resin composed of a polymer constituted of a first structural unit composed of at least one of the compounds represented by the formula (I), and of a second structural unit composed of at least one of the compounds represented by the formula (II), and having a weight-average molecular weight of from $1 \times 10^3$ to $5 \times 10^6$:

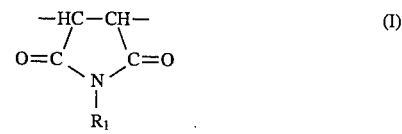

where $R_1$ denotes an alkyl group having 1 to 18 carbons or a cycloalkyl group having 3 to 8 carbons;

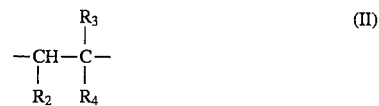

where $R_2$ denotes hydrogen or an alkyl group having 1 to 8 carbons, and $R_3$ and $R_4$ denote respectively an alkyl group having 1 to 8 carbons. The optical material is superior in transparency, heat resistance, surface hardness, mechanical strength, and other properties.

14 Claims, No Drawings

OPTICAL MATERIAL

This is a Rule 62 File Wrapper Continuation of application Ser. No. 08/253,221, filed Jun. 2, 1994, now abandoned, which is a Rule 62 File Wrapper Continuation of 07/718,411, filed Jun. 24, 1991, now abandoned.

BACKGROUND OF THE INVENTION

1. Field of the Invention

The present invention relates to an optical material which comprises an N-alkyl-substituted maleimide-olefin copolymer, and which is superior in transparency, heat resistance, surface hardness, mechanical strength, and other properties.

2. Description of the Related Art

Heretofore, optical materials are generally made of glass. Recently, transparent polymer materials have come to be used for optical materials in view of the productivity, light-weight, cost and so forth.

Such polymer materials includes polymethyl methacrylate (hereinafter referred to as "PMMA") and polycarbonate (hereinafter referred to as "PC").

PMMA, however, is limited in its use because of its insufficient heat-resistance resulting from its glass transition temperature (Tg) of about 100° C., although it has superior optical characteristics.

PC, which has a Tg of about 140° C. and has relatively high heat resistance, involves the disadvantages of poorer optical characteristics in comparison with PMMA, low surface hardness causing susceptibility to scratching, low weatherability, low moldability, and so forth.

On the other hand, maleimide type copolymers are being studied comprehensively because of its high heat resistance. For example, copolymerization of the aforementioned methyl methacrylate with N-aromatic-substituted maleimide is disclosed in Japanese Patent Publication No. Sho 43-9753, Japanese Patent Application Laid-Open Nos. Sho 61-141715, Sho 61-171708, and Sho 62-109811; and copolymerization of styrene resins with N-aromatic-substituted maleimide is disclosed in Japanese Patent Application Laid-Open Nos. Sho 47-6891, Sho 61-76512, and Sho 61-276807. The resins produced by these methods are improved more in heat resistance with the higher content of N-aromatic-substituted maleimide, but thereby causing problems of brittleness, low moldability, lowered transparency, and so forth, thus being limited in use for optical materials.

After comprehensive study regarding the above problems, it was found that an optical material comprising an N-alkyl-substituted maleimide-olefin type copolymer solves the problems, and the present invention has been accomplished.

SUMMARY OF THE INVENTION

The present invention intends to provide an optical material which is superior in transparency, heat resistance, surface hardness, mechanical strength, and other properties.

The present invention provides an optical material, comprising a resin composed of a polymer constituted of 50 to 98 mol %, based on the polymer, of a first structural unit composed of at least one of the compounds represented by the formula (I) and 50 to 2 mol %, based on the polymer, of a second structural unit composed of at least one of the compounds represented by the formula (II), and having a weight-average molecular weight of from $1 \times 10^3$ to $5 \times 10^6$ measured by gel permeation chromatography (GPC) with standard polystyrene for calibration:

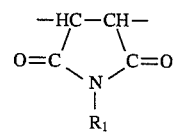

where $R_1$ denotes an alkyl group having 1 to 18 carbons or a cycloalkyl group having 3 to 8 carbons;

where $R_2$ denotes hydrogen or an alkyl group having 1 to 8 carbons, and $R_3$ and $R_4$ denote respectively an alkyl group having 1 to 8 carbons.

DETAILED DESCRIPTION OF THE PREFERRED EMBODIMENT

The resin constituting the optical material of the present invention can be derived, for example, from radical copolymerization of an N-alkyl-substituted maleimide with an olefin.

The compounds which give the structural unit (I) are N-alkyl-substituted maleimides such as N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclohexylmaleimide, and the like. These may be used singly or used combinedly in polymerization. The combination ratio thereof is not limited.

The compounds which give the structural unit (II) are olefins such as isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, 2-methyl-2-hexene, and the like. These may be used singly or used combinedly in polymerization. The combination ratio thereof is not limited.

The content of the structural unit (I) is in the range of from 50 to 98 mol %, preferably from 50 to 75 mol % of the whole polymer. At the content of the structural unit of 98 mol % or higher, the resulting polymer is brittle unpreferably.

An additional vinyl monomer may be copolymerized within the range in which the object of the present invention is achievable. The additional vinyl monomer includes styrene, α-methylstyrene, vinyltoluene, 1,3-butadiene, isoprene, and their halogenated derivatives; methacrylic esters such as methyl methacrylate, ethyl methacrylate, cyclohexyl methacrylate, phenyl methacrylate, and benzyl methacrylate; acrylic esters such as methyl acrylate, ethyl acrylate, butyl acrylate, cyclohexyl acrylate, phenyl acrylate, and benzyl acrylate; vinyl esters such as vinyl acetate, and vinyl benzoate; vinyl ethers such as methyl vinyl ether, ethyl vinyl ether, propyl vinyl ether, and butyl, vinyl ether; vinyl chloride, vinylidene chloride, maleic anhydride, N-phenylmaleimide, N-carboxyphenylmaleimide, acrylonitrile, ethylene, propylene, 1-butene, 2-butene, and 1-hexene, or two or more of their combination.

The polymerization may be conduced by any known, polymerization process including bulk polymerization, solution polymerization, suspension polymerization, and emulsion polymerization, among which the solution polymerization is particularly preferable.

The polymerization initiator includes organic peroxides such as benzoyl peroxide, lauryl peroxide, octanoyl peroxide, acetyl peroxide, di-t-butyl peroxide, t-butylcumyl peroxide, dicumyl peroxide, t-butyl peroxyacetate, and t-butyl peroxybenzoate; and azo type initiators such as 2,2'-azobis(2,4-dimethylvaleronitrile), 2,2'-azobis(2-butyronitrile), 2,2'-azobisisobutylonitrile, dimethyl-2,2'-azobisisobutylate, and 1,1'-azobis(cyclohexane-1-carbonitrile).

The solvent useful in the solution polymerization includes benzene, toluene, xylene, ethylbenzene, cyclohexane, dioxane, tetrahydrofuran, acetone, methyl ethyl ketone, dimethylformamide, isopropyl alcohol, butyl alcohol, and the like.

The polymerization temperature is suitably determined depending on the decomposition temperature of the initiator. Generally the polymerization is conducted preferably in the range of from 40° to 150° C.

The weight-average molecular weight of the resulting polymer can be measured by gel permeation chromatography (GPC) with standard polystyrens for calibration. The molecular weight of the resin of the present invention is in the range of from $1 \times 10^3$ to $5 \times 10^6$, preferably from $1 \times 10^4$ to $5 \times 10^5$. The polymers having molecular weight of higher than $5 \times 10^6$ are poor in moldability, while the polymers having molecular weight of lower than $1 \times 10^3$ are brittle.

The remaining monomer contained in the polymer is not more than 3% by weight, preferably not more than 1% by weight, particularly preferably not more than 0.1% by weight. If the resulting monomer content exceeds 3% by weight, the polymer tends to lose transparency, causing disadvantage. The optical material of the present invention is constituted of a resin having yellowness index (YI) of not higher than 20, preferably not higher than 10, more preferably not higher than 5, as measured with a test specimen of 0.8 mm thick by a color computer (made by Suga Shikenki K.K.).

The aforementioned resin may also be produced by post-imidation of a copolymer resin of maleic anhydride and an olefin by use of alkylamine or the like. Such post-imidation reaction can be conducted, for example, by dissolving or dispersing a maleic anhydride-isobutene copolymer in a solvent such as an alcohol like methanol, ethanol, or propanol, or an aromatic solvent like benzene, or toluene, and then reacting it with a primary amine like methylamine at a temperature of from 100° to 350° C. However, the polymer produced by such a post-imidation reaction is liable to be colored or to become poor in heat stability. Therefore, the optical material of the present invention is preferably be synthesized by radical copolymerization of an N-alkyl-substituted maleimide with an olefin.

The resin of the present invention may contain a hindered phenol, a heat stabilizer such as organic phosphate esters, a benzotriazole type UV absorbing agent, a hindered amine type UV stabilizer, a lubricant, a dye or the like. Further, the resin of the present invention may be blended with another compatible resin, if necessary.

The resin of the present invention can be molded by an ordinary molding process including injection molding, extrusion molding, compression molding, and spin-coating.

The resulting molded articles are useful for optical lenses, optical fibers, optical disc and card substrates, prisms, automobile lenses, signal lenses, illumination parts, and the like.

Optical lenses are exemplified by spherical and non-spherical lenses such as compact disk lenses, video lenses, camera lenses, and eyeglass lenses. For these uses, the lenses are desired to have light transmittance of not lower than 80%, preferably not lower than 90%; refractive index of not less than 1.49, preferably not less than 1.50; Abbe's number of not less than 35, preferably not less than 45; glass transition temperature of not lower than 100° C., preferably not lower than 120° C., still more preferably not lower than 140° C.; linear expansion coefficient of not more than $10 \times 10^{-5} °C.^{-1}$, preferably not more than $7 \times 10^{-5} °C.^{-1}$, still more preferably not more than $6 \times 10^{-5} °C.^{-1}$; and surface hardness of H or higher.

For optical fiber uses, the reins are desired to have light transmittance of not lower than 80%, preferably not lower than 90%; refractive index of not less than 1.45, preferably not less than 1.50; glass transition temperature of not lower than 100° C., preferably not lower than 120° C., still more preferably not lower than 140° C.; light transmission loss at 646 nm of not more than 5000 dB/km, preferably not more than 3000 dB/km, still more preferably not more than 1000 dB/km; and flexural modulus of not less than 25000 kg/cm$^2$, preferably not less than 30000 kg/cm$^2$.

For use for optical disk substrates, the resin is desired to have light transmittance of not less than 80%, preferably not less than 85%; refractive index of not less than 1.49; birefringence of not more than 100 nm, preferably not more than 50 nm; surface hardness of not lower than H, preferably not lower than 2H, more preferably not lower than 3H; and flexural modulus of not less than 25000 kg/cm$^2$, preferably not less than 30000 kg/cm$^2$, still more preferably not less than 40000 kg/cm$^2$. If necessary, the disk may be further surface-treated for hard coat.

Automobile lenses include headlight lenses, foglight lenses, turn indicator lenses, brake light lenses, etc. Illumination parts include illumination covers, illumination accessories, and the like. For uses for such automobile lenses, illumination parts, and signal lenses, the resins are desired to have light transmittance of not less than 80%, preferably not less than 85%; surface hardness of not lower than H, preferably not lower than 2H, still more preferably not lower than 3H; refractive index of not less than 1.49, preferably not less than 1.50; glass transition temperature of not lower than 110° C., preferably not lower than 130° C., still more preferably not lower than 150° C.; and light resistance giving yellowness index change of not more than 20, preferably not more than 10, still more preferably not more than 3 in 200 hours of a UV-accelerated test. If necessary, the lens may be further surface-treated for hard coating.

The present invention is described by reference to examples without limiting the invention thereto in any way.

The molecular weight of the resulting polymer was measured by means of GPC (HLC-802A, made by Tosoh Corporation) in polystyrene equivalent.

The Tg of the resulting polymer was measured in nitrogen atmosphere at a temperature elevation rate of 10° C./min. by means of DSC200 (Differential Scanning Colorimeter made by Seiko Denshi K.K.).

The decomposition temperature (Td) of the resulting polymer was measured in nitrogen atmosphere at a temperature elevation rate of 40° C./min. by means of TG/DTA200 (made by Seiko Denshi K.K.).

The softening temperature and the linear expansion coefficient was measured under loading of 1.18 kg/cm$^2$ at a temperature elevation rate of 10° C./min by means of TMA100 (made by Seiko Denshi K.K.).

The light transmittance was measured according to ASTM 1746. The refractive index and the Abbe's number were measured by use of Abbe refractometer.

The flexural strength, the flexural modulus (ASTM D790), and the pencil hardness (JIS K5401) were evaluated with test specimens of 80×12×3 mm formed by means of an injection molding machine (Panajection, made by Matsushita Electric Works, Ltd.).

The yellowness index (JIS K7105; Reflection method, tristimulus values of reflector - x:79.44 y:82.22 z:94.51) was evaluated with a pressed piece of 50×25×0.8 mm in size by means of a color computer (made by Suga Shikenki K.K.). The light resistance of the polymer was evaluated by change of yellowness index by exposure to ultraviolet light at an intensity of 100 mW/cm$^2$ at 63° C. for 200 hours by means of Super UV Tester (made by Dainippon Plastics K.K.).

EXAMPLE 1

55.6 g (0.5 mole) of N-methylmaleimide, 0.8 g (5.0×10$^{-3}$ mole) of 2,2'-azobisisobutyronitrile (AIBN), and 800 ml of dioxane were placed in a 1-liter autoclave equipped with a stirrer, a nitrogen introducing tube, a thermometer, and a degassing tube. The autoclave was purged with nitrogen several times, and 56.1 g (1.0 mole) of isobutene was charged therein. The mixture was reacted at 60° C. for 10 hours.

The reaction mixture was poured into ethanol to deposit the polymer. The obtained polymer was purified by reprecipitation from dioxane-methanol, and was dried under reduced pressure at 60° C. for 24 hours. The yield of the polymer was 80.5 g, and the remaining monomer therein was not more than 0.1% by weight.

The maleimide unit content in the resulting polymer was found to be 50 mol % from the elemental analysis of the polymer (C: 64.7%, H: 7.8%, N: 8.4% by weight). The polymer had molecular weight (Mw)=163,000, Tg=152° C., and Td=397° C.

EXAMPLE 2

An N-ethylmaleimide-isobutene copolymer was synthesized in the same manner as in Example 1.

The maleimide unit content of the polymer was 52 mol % from elemental analysis of the polymer. The resulting polymer had molecular weight (Mw)=102,000, Tg=125° C., and Td=390° C.

EXAMPLE 3

An N-isopropylmaleimide-isobutene copolymer was synthesized in the same manner as in Example 1.

The maleimide unit content of the polymer was 50 mol % from elemental analysis of the polymer. The resulting polymer had molecular weight (Mw)=141,000, Tg=145° C., and Td=389° C.

EXAMPLE 4

An N-cyclohexylmaleimide-isobutene copolymer was synthesized in the same manner as in Example 1.

The maleimide unit content of the polymer was 51 mol % from elemental analysis of the polymer. The resulting polymer had molecular weight (Mw)=124,000, Tg=189° C., and Td=398° C.

EXAMPLE 5

An N-cyclohexylmaleimide/N-methylmaleimide-isobutene copolymer was synthesized in the same manner as in Example 1.

The cyclohexylmaleimide unit content of the polymer was 26 mol %, the methylmaleimide content thereof was 26 mol %, and the isobutene content was 48 mol % from elemental analysis and NMR analysis of the polymer. The resulting polymer had molecular weight (Mw)=159,000, Tg=173° C., and Td=404° C.

EXAMPLE 6

An N-cyclohexylmaleimide-isobutene/isooctene copolymer was synthesized in the same manner as in Example 1.

The cyclohexylmaleimide unit content of the resulting polymer was 50 mol %, the isobutene unit content was 45 mol %, and isooctene unit content was 5 mol % from elemental analysis of the polymer and gas chromatograph analysis of the remaining monomer after polymerization. The resulting polymer had molecular weight (Mw)=247,000, Tg=201° C., and Td=402° C.

COMPARATIVE EXAMPLES 1 AND 2

PMMA (Acrypet, made by Mitsubishi Rayon Co., Ltd.) and PC (Panlite, made by Teijin Kasei K.K.) were employed for comparison. The glass transition temperature of the PMMA was 105° C., and that of the PC was 141° C.
(Evaluation of mechanical properties)

Several polymerization batches of the respective samples of Examples 1–5 were prepared. The samples were extruded by Labo-plasto-mill (made by Toyo Seiki Co., Ltd.), and molded by small-size injection machine. The physical properties measured are shown in Table 1 together with the properties of PMMA and PC.
(Evaluation of thermal characteristics)

Softening temperatures and linear expansion coefficients of samples of Examples 1–6 were measured by TMA. The results of the measurement are shown in Table 2 together with the results of PMMA and PC.
(Evaluation of optical properties)

The light transmittance, the refractive index, and the Abbe's number, yellowness index were evaluated of the resins synthesized in Examples 1, 3, and 4. The results of the measurements are shown in Table 3 together with the results of the PMMA and PC.
(Evaluation of the light resistance)

The resins synthesized in Examples 1, 3, and 4 were evaluated for light resistance by accelerated test with a UV tester. The results are shown in Table 4 together with the results of PMMA and PC.

EXAMPLE 7

The resins synthesized in Examples 1 and 3 were molded into disk substrates of 130 mm diameter under the molding conditions shown in Table 5. The birefringence thereof was measured at a position of 30 mm apart from the center. The results are shown in Table 5 together with the results of PMMA and PC.

EXAMPLE 8

The resins synthesized in Example 1 and 3 were molded into optical fibers and evaluated for light transmission loss.

The resin was melted and extruded by a piston type extruder in a strand form, and taken out by rollers to be shaped into a strand of 1 mm in diameter. This strand was passed through a solution of 2,2,2-trifluoroethyl methacrylate polymer to prepare an optical fiber having a core-sheath structure.

The light transmission loss of the fibers was respectively 430 dB/km and 280 dB/km.

As clearly understood from the Examples, present invention provides an optical material which is superior in transparency, heat resistance, surface hardness and mechanical properties.

TABLE 1

| Sample | Flexural Strength (kg/cm²) | Flexural Modulus (kg/cm²) | Pencil Hardness |
|---|---|---|---|
| Example | | | |
| 1 | 1200 | 49000 | 3H |
| 2 | 980 | 39000 | 2H |
| 3 | 870 | 33000 | H |
| 4 | 660 | 29000 | 2H |
| 5 | 830 | 38000 | 2H |
| Comparative Example | | | |
| 1 | 950 | 32000 | 3H |
| 2 | 820 | 28000 | B |

TABLE 2

| Sample | Glass Transition Temperature (°C.) | Softener Temperature (°C.) | Linear Expansion Coefficient (°C.⁻¹) |
|---|---|---|---|
| Example | | | |
| 1 | 152 | 155 | $5.1 \times 10^{-5}$ |
| 2 | 125 | 124 | $5.5 \times 10^{-5}$ |
| 3 | 145 | 143 | $5.6 \times 10^{-5}$ |
| 4 | 189 | 183 | $5.8 \times 10^{-5}$ |
| 5 | 173 | 170 | $5.3 \times 10^{-5}$ |
| 6 | 201 | 192 | $5.8 \times 10^{-5}$ |
| Comparative Example | | | |
| 1 | 105 | 96 | $7.7 \times 10^{-5}$ |
| 2 | 141 | 140 | $7.0 \times 10^{-5}$ |

TABLE 3

| Sample | Light Transmittance (%) | Refractive Index | Abbe's Number | Yellowness Index |
|---|---|---|---|---|
| Example | | | | |
| 1 | 92 | 1.53 | 49.7 | 3.5 |
| 3 | 92 | 1.52 | 51.0 | 3.3 |
| 4 | 92 | 1.52 | 51.3 | 3.5 |
| Comparative Example | | | | |
| 1 | 92 | 1.49 | 51.5 | 3.0 |
| 2 | 88 | 1.58 | 29.2 | 4.0 |

TABLE 4

| | Change of Yellowness Index | |
|---|---|---|
| | After 50 Hours | After 200 Hours |
| Example | | |
| 1 | 0.5 | 1.8 |
| 3 | 0.3 | 2.1 |
| 4 | 0.0 | 1.1 |
| Comparative Example | | |
| 1 | 1.4 | 4.8 |
| 2 | 63.9 | 75.4 |

TABLE 5

| Sample | Cylinder Temperature (°C.) | Mold Temperature (°C.) | Birefringence (nm) | Softening Temperature (°C.) |
|---|---|---|---|---|
| Example | | | | |
| 1 | 320 | 120 | 18 | 155 |
| 3 | 300 | 100 | 10 | 143 |
| Comparative Example | | | | |
| 1 | 260 | 60 | 18 | 96 |
| 2 | 320 | 120 | 345 | 140 |

What is claimed is:

1. An optical material composed of a polymer constituted of 50 to 98 mol %, based on the polymer, of a first structural unit composed of at least one of the compounds represented by the formula (I), and 50 to 2 mol %, based on the polymer, of a second structural unit composed of at least one of the compounds represented by the formula (II), having a light transmittance of at least 80%, a refractive index of at least 1.49, an Abbe's number of at least 35, a glass transition temperature of at least 100° C., a linear expansion coefficient of less than $10 \times 10^{-5}$°C.$^{-1}$, surface hardness of at least H and having a weight average molecular weight of from $1 \times 10^3$ to $5 \times 10^6$ measured by gel permeation chromatography (GPC) with standard polystyrene for calibration:

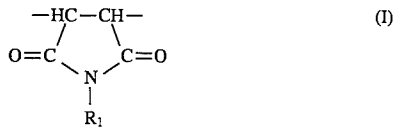
(I)

where $R_1$ is methyl, ethyl, isopropyl or cyclohexyl;

(II)

where $R_2$ is hydrogen, $R_3$ is methyl and $R_4$ is methyl, ethyl or butyl.

2. An optical fiber according to claim 1 wherein the light transmittance is at least 90%, the refractive index is at least 1.50, the glass transition temperature is at least 140° C., the light transmission loss is less than 3000 dB/km, and the flexural modulus is at least 30000 kg/cm.

3. An optical disc substrate composed of a polymer constituted of 50 to 98 mol %, based on the polymer, of a first structural unit composed of at least one of the compounds represented by the formula (I), and 50 to 2 mol %, based on the polymer, of a second structural unit composed of at least one of the compounds represented by the formula (II), having a light transmittance of at least 80%, a refractive index of at least 1.49, an Abbe's number of at least 35, a glass transition temperature of at least 100° C., a linear expansion coefficient of less than $10 \times 10^{-5} °C.^{-1}$, surface hardness of at least H, and having a weight average molecular weight of from $1 \times 10^3$ to $5 \times 10^6$ measured by gel permeation chromatography (GPC) with standard polystyrene for calibration:

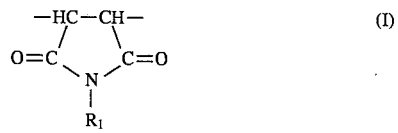   (I)

where $R_1$ is methyl, ethyl, isopropyl or cyclohexyl;

   (II)

where $R_2$ is hydrogen, $R_3$ is methyl and $R_4$ is methyl, ethyl or butyl.

4. An optical disc substrate according to claim 3 wherein the light transmittance is 85%, the birefringence is less than 50 nm, a surface hardness of at least 2H, and a flexural modulus of at least 30000 kg/cm².

5. An automobile lens composed of a polymer constituted of 50 to 98 mol %, based on the polymer, of a first structural unit composed of at least one of the compounds represented by the formula (I) and 50 to 2 mol % based on the polymer, of a second structural unit composed of at least one of the compounds represented by the formula (II), having a light transmittance of at least 80%, a refractive index of at least 1.49, an Abbe's number of at least 35, a glass transition temperature of at least 100° C., a linear expansion coefficient of less than $10 \times 10^{-5} °C.^{-1}$, surface hardness of at least H, and having a weight average molecular weight of from $1 \times 10^3$ to $5 \times 10^6$ measured by gel permeation chromatography (GPC) with standard polystyrene for calibration:

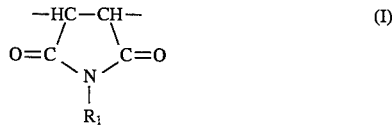   (I)

where $R_1$ is methyl, ethyl, isopropyl or cyclohexyl;

   (II)

where $R_2$ is hydrogen, $R_3$ is methyl and $R_4$ is methyl, ethyl or butyl.

6. An automobile lens according to claim 5 wherein the light transmittance is at least 85%, the surface hardness is at least 3H, the refractive index is at least 1.50, the glass transition temperature is at least 150° C., and the yellowness index is less than 5.

7. A heat resistant optical part having a pencil hardness of at least H, a yellowness index of not larger than 5 and a glass transition temperature of at least 140° C. and comprising a resin composed of a polymer constituted of 50–98 mol %, based on the polymer, of a first structural unit composed of at least one of the compounds represented by the formula (I), and 50 to 2 mol %, based on the polymer, of a second structural unit composed of at least one of the compounds represented by the formula (II), and having a weight-average molecular weight of from $1 \times 110^3$ to $5 \times 10^6$ measured by gel permeation chromatography (GPC) calibrated with polystyrene;

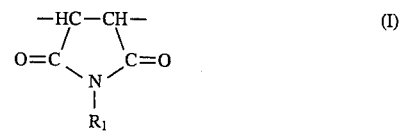   (I)

where $R_1$ is methyl, isopropyl or cyclohexyl, and

   (II)

where $R_2$ is hydrogen, $R_3$ is methyl and $R_4$ is methyl, ethyl or butyl.

8. An optical disc substrate according to claim 7.
9. An optical fiber according to claim 7.
10. An illuminating device according to claim 7.
11. A spherical or nonspherical optical lens having a first concave or convex optical surface and a second concave or convex optical surface, said lens having a light transmittance of at least 80%, a refractive index of at least 1.49, an Abbe's number of at least 35, a glass transition temperature of at least 140° C., a linear expansion coefficient of less than $10 \times 10^{-5}$ C.$^{-1}$ and a surface hardness of at least H, said lens composed of a polymer constituted of 50 to 98 mol %, based on the polymer, of a first structural unit composed of at lest one of the compounds represented by the formula (I), and 50 to 2 mol %, based on the polymer, of a second structural unit composed of at least one of the compounds represented by the formula II, and having a weight average molecular weight of from $1 \times 10^3$ to $5 \times 10^6$ measured by gel permeation chromatography (GPC) with standard polystyrene for calibration:

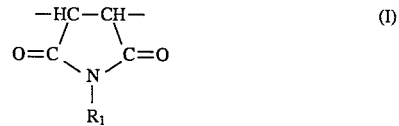   (I)

where $R_1$ is methyl, isopropyl or cyclohexyl;

   (II)

where $R_2$ is hydrogen, $R_3$ is methyl and $R_4$ is methyl, ethyl or butyl.

12. An optical lens according to claim 11 wherein the light transmittance is at least 90%, the refractive index is at least 1.50, the Abbe's number is at least 45, the glass transition temperature is at least 120° C., and the linear expansion coefficient is at most $6 \times 10^{-5}$ C.$^{-1}$.

13. An automotive lens according to claim 11.
14. A signal lens according to claim 11.

* * * * *